United States Patent
Williams et al.

(10) Patent No.: US 6,658,391 B1
(45) Date of Patent: Dec. 2, 2003

(54) STRATEGIC PROFILING

(76) Inventors: Gary A. Williams, 715 State Street Ct., Roswell, GA (US) 30075; Robert B. Miller, 2440 Pamo Ave., San Diego, CA (US) 94104

( * ) Notice: Subject to any disclaimer, the term of this patent is extended or adjusted under 35 U.S.C. 154(b) by 0 days.

(21) Appl. No.: 09/475,159

(22) Filed: Dec. 30, 1999

(51) Int. Cl.[7] .............................................. G06F 17/60
(52) U.S. Cl. .................. 705/10; 705/7; 705/1
(58) Field of Search ........................ 705/10, 7, 1, 11, 705/8, 9; 434/236, 238

(56) References Cited

U.S. PATENT DOCUMENTS

| | | | | | |
|---|---|---|---|---|---|
| 4,930,077 | A | * | 5/1990 | Fan ................................ | 704/8 |
| 4,931,934 | A | * | 6/1990 | Snyder ....................... | 434/236 |
| 5,041,972 | A | * | 8/1991 | Frost ........................... | 705/10 |
| 5,124,911 | A | * | 6/1992 | Sack ........................... | 705/10 |
| 5,406,477 | A | * | 4/1995 | Harhen ......................... | 703/6 |
| 5,408,411 | A | * | 4/1995 | Nakamura et al. ............ | 701/48 |
| 5,696,981 | A | * | 12/1997 | Shovers ....................... | 704/10 |
| 5,889,799 | A | * | 3/1999 | Grossman et al. ..... | 379/266.08 |
| 5,918,207 | A | * | 6/1999 | McGovern et al. ........... | 705/1 |
| 6,009,407 | A | * | 12/1999 | Garg ........................... | 705/10 |
| 6,098,052 | A | * | 8/2000 | Kosiba et al. ................ | 705/40 |
| 6,185,534 | B1 | * | 2/2001 | Breese et al. ............... | 704/270 |
| 6,430,539 | B1 | * | 8/2002 | Lazarus et al. .............. | 705/10 |
| 2001/0044739 | A1 | * | 11/2001 | Bensemana .................. | 705/10 |

FOREIGN PATENT DOCUMENTS

EP        921482 A2  *  6/1999   ............. G06F/3/00

OTHER PUBLICATIONS

Gray, Steven, "The digital you", Oct. 1996, PC World, v14, n10, pM14(1).*

Johnston, Christopher, "Tell it to Dr. Shrink. (personality analysis program) (product announcement)", Dec. 1998, PC–Computing, v1, n5, p64(1).*

McCullough, Jule, "me2", May, 1994, Humanagement and FTP Software.* http://or.psychology.dal.ca/~wcs/hidden/SAdocs/SA_announce.html, Schmidt, William C., "World–Wide Web Survey Research Made Easy with 'WWW Survey Assistant'", 1997, Behavior Research Methods, Instruments & Computers, 29(2).* http://users.wmin.ac.uk/~buchant/downloads/scip99.html, T. Buchanan, "WWW Personality Assesment: Evaluation of an on–line Five Factor Inventory".*

Http://ipip.org/ipip/text.htm, Goldberg, Lewis R., "A Broad–Bandwidth, Public–Domain, Personality hnventory Measuring the Lower–Level Facets of Several Five–Factor Models".*

* cited by examiner

*Primary Examiner*—Tariq R. Hafiz
*Assistant Examiner*—Akiba K Robinson-Boyce
(74) *Attorney, Agent, or Firm*—Procopio, Cory, Hargreaves & Savitch, LLP (57) ABSTRACT

A method and apparatus for understanding and predicting customer behavior called the Strategic Profiler is disclosed. In the Strategic Profiler, multiple participants input data representing ideals, reality, and experiences. The data are collected and analyzed using a multiple factor personality model to determine key value drivers, with one value driver associated with each factor in the multiple factor personality model employed. The data are further analyzed to determine the participants' impression of how closely reality meets the ideal, based both on impressions and experience. In a preferred embodiment, the Strategic Profiler is available to multiple users simultaneously through the World Wide Web.

18 Claims, 7 Drawing Sheets

| Characteristic | More | ← | | | → | More | Characteristic |
|---|---|---|---|---|---|---|---|
| Ruthless | ● | ○ | ○ | ○ | ○ | ○ | ○ | Soft-hearted |
| Retiring | ○ | ● | ○ | ○ | ○ | ○ | ○ | Sociable |
| Self-disciplined | ○ | ○ | ● | ○ | ○ | ○ | ○ | Weak-willed |
| Fun-loving | ○ | ○ | ○ | ● | ○ | ○ | ○ | Serious |
| Calm | ○ | ○ | ○ | ○ | ● | ○ | ○ | Worrying |
| Down-to-earth | ○ | ○ | ○ | ○ | ○ | ● | ○ | Imaginative |
| Careful | ○ | ○ | ○ | ○ | ○ | ○ | ● | Careless |
| Suspicious | ● | ○ | ○ | ○ | ○ | ○ | ○ | Trusting |
| Routine-oriented | ○ | ● | ○ | ○ | ○ | ○ | ○ | Variety-oriented |
| Self-pitying | ○ | ○ | ● | ○ | ○ | ○ | ○ | Self-satisfied |
| Conforming | ○ | ○ | ○ | ● | ○ | ○ | ○ | Independent |
| Helpful | ○ | ○ | ○ | ○ | ● | ○ | ○ | Uncooperative |
| Insecure | ○ | ○ | ○ | ○ | ○ | ● | ○ | Secure |
| Disorganized | ○ | ○ | ○ | ○ | ○ | ○ | ● | Well-organized |
| Affectionate | ● | ○ | ○ | ○ | ○ | ○ | ○ | Reserved |

Figure 3

| Characteristic | More | | | | | | More | Characteristic |
|---|---|---|---|---|---|---|---|---|
| Ruthless | O | O | O | O | O | O | ● | Soft-hearted |
| Retiring | O | O | O | O | O | ● | O | Sociable |
| Self-disciplined | O | O | O | O | ● | O | O | Weak-willed |
| Fun-loving | O | O | O | ● | O | O | O | Serious |
| Calm | O | O | ● | O | O | O | O | Worrying |
| Down-to-earth | O | ● | O | O | O | O | O | Imaginative |
| Careful | ● | O | O | O | O | O | O | Careless |
| Suspicious | O | O | O | O | O | O | ● | Trusting |
| Routine-oriented | O | O | O | O | O | ● | O | Variety-oriented |
| Self-pitying | O | O | O | O | ● | O | O | Self-satisfied |
| Conforming | O | O | O | ● | O | O | O | Independent |
| Helpful | O | O | ● | O | O | O | O | Uncooperative |
| Insecure | O | ● | O | O | O | O | O | Secure |
| Disorganized | ● | O | O | O | O | O | O | Well-organized |
| Affectionate | O | O | O | O | O | O | ● | Reserved |

Figure 4

| Attributes / Benefits | Less ← | | Importance | | | → More | |
|---|---|---|---|---|---|---|---|
| Provides a reasonable cost & benefit analysis for their offerings | ● | ○ | ○ | ○ | ○ | ○ | ○ |
| Demonstrates concern about handling confidential data & info | ○ | ○ | ● | ○ | ○ | ○ | ○ |
| Offers you imaginative ways of how to do business in the future | ○ | ○ | ○ | ○ | ○ | ○ | ● |
| Conforms to fit your company's atmosphere and culture | ○ | ○ | ○ | ● | ○ | ○ | ○ |
| Is passionate about meeting your company's goals | ○ | ○ | ○ | ○ | ○ | ● | ○ |
| Conducts business in a reserved manner | ○ | ● | ○ | ○ | ○ | ○ | ○ |
| Provides you a way to think proactively | ○ | ○ | ○ | ○ | ● | ○ | ○ |
| Allows you to react to your employees' demands | ● | ○ | ○ | ○ | ○ | ○ | ○ |
| Instills trust in your company from your employees | ○ | ○ | ● | ○ | ○ | ○ | ○ |
| Questions and advises on your company's plans and initiatives | ○ | ○ | ○ | ○ | ○ | ○ | ● |
| Grows your sales revenues and profits | ○ | ○ | ○ | ● | ○ | ○ | ○ |
| Helps build customer loyalty and attract customers to return again | ○ | ○ | ○ | ○ | ○ | ● | ○ |
| Works reliably at reducing costs and working efficiently | ○ | ● | ○ | ○ | ○ | ○ | ○ |
| Maintains highest sanitation standards | ○ | ○ | ○ | ○ | ● | ○ | ○ |
| Implements programs that are flexible and simple to manage | ● | ○ | ○ | ○ | ○ | ○ | ○ |
| Allows you to focus your energies on your core business by freeing you up to concentrate on what you do best | ● | ○ | ○ | ○ | ○ | ○ | ○ |
| Constantly improves, innovates and reinvigorates their service through audits, surveys and other feedback mechanisms | ○ | ○ | ● | ○ | ○ | ○ | ○ |

Figure 5A

| Attributes / Benefits | Less ← Importance → More | | | | | | |
|---|---|---|---|---|---|---|---|
| Delivers programs that offer variety, improved décor, food presentation, and food promotions | ● | ○ | ○ | ○ | ○ | ○ | ○ |
| Is the recognized industry standard | ○ | ○ | ● | ○ | ○ | ○ | ○ |
| Has a screening and interviewing process to select only the highest caliber employees | ○ | ○ | ○ | ○ | ○ | ○ | ● |
| Maintains highest ethical standards | ○ | ○ | ○ | ● | ○ | ○ | ○ |
| Cross-trains employees to broaden skills, job knowledge and performance | ○ | ○ | ○ | ○ | ○ | ● | ○ |
| Utilizes technologically advanced hardware and software tools | ○ | ● | ○ | ○ | ○ | ○ | ○ |
| Supplies accurate reports to better evaluate return on your dollars | ○ | ○ | ○ | ○ | ● | ○ | ○ |
| Delivers the highest quality food that is fresh, customized, and creative | ● | ○ | ○ | ○ | ○ | ○ | ○ |
| Is the most enjoyable provider with whom to work | ○ | ○ | ● | ○ | ○ | ○ | ○ |
| Provides menu alternatives that are healthier and meet national guidelines | ○ | ○ | ○ | ○ | ○ | ○ | ● |
| Is capable of catering all your events | ○ | ○ | ○ | ● | ○ | ○ | ○ |
| Assures that every aspect of your program is tailored to your precise circumstances and needs | ○ | ○ | ○ | ○ | ○ | ● | ○ |
| Maintains a public image that is based on a long, successful history | ○ | ● | ○ | ○ | ○ | ○ | ○ |
| Is capable of reducing your number of service contractors | ○ | ○ | ○ | ○ | ● | ○ | ○ |
| Is willing to participate or assist in your recycling and other disposal programs | ● | ○ | ○ | ○ | ○ | ○ | ○ |
| Prepares and executes based on work plans | ● | ○ | ○ | ○ | ○ | ○ | ○ |
| Maintains a single individual, the Food Service Director, at your location totally responsible for planning, organizing and supervising your food service | ○ | ○ | ● | ○ | ○ | ○ | ○ |

Figure 5B

| Attributes / Benefits | Less ← Importance → More | | | | | | |
|---|---|---|---|---|---|---|---|
| Delivers a sit-down, restaurant-like experience for your customers | ● | ○ | ○ | ○ | ○ | ○ | ○ |
| Has a recognized brand name | ○ | ○ | ● | ○ | ○ | ○ | ○ |
| Offers value meals and promotions on a regular basis | ○ | ○ | ○ | ○ | ○ | ○ | ● |
| Maintains a high level of professionalism | ○ | ○ | ○ | ● | ○ | ○ | ○ |
| Exhibits confidence in their approach to service | ○ | ○ | ○ | ○ | ○ | ● | ○ |
| Compares their offerings to competitors and shares their findings | ○ | ● | ○ | ○ | ○ | ○ | ○ |
| Is primarily concerned about satisfying the customer rather than fulfilling a contract | ○ | ○ | ○ | ○ | ● | ○ | ○ |
| Is convenient and easy to do business with | ● | ○ | ○ | ○ | ○ | ○ | ○ |

Figure 5C

STRATEGIC PROFILING

BACKGROUND OF THE INVENTION

Field of the Invention

Today's business environment is changing rapidly. The pace of this change has accelerated by virtue of new technologies such as increasingly powerful personal computers, local area networks, wide area networks, and the Internet. However, existing sales development training programs were developed and designed for implementation during the pre-Internet era. The widespread availability of information, which has been made possible in part because of the Internet, has put the customer in control of the sales process.

Essentially, if a customer knows his precise needs, the vast amount of information virtually instantaneously at his disposal through the internet will permit him to locate the best solution to his needs. In order to be successful in this type of a sales environment, it is necessary for sales personnel to understand their customers perhaps even better than the customers do themselves. In other words, it is in large part the function of the sales professional to determine with a high degree of specificity exactly what the customer's needs are. Subsequently, the sales professional will be able to tailor a product or service to meet that customer's needs precisely and completely.

Sales professionals therefore require a tool that unlocks the secrets of understanding customers' behavior, in order to acquire knowledge of the customer's needs. By thoroughly understanding their customers' needs, sales professionals can enable their customers to see things the way they really are. Particularly, the sales professional who thoroughly understands his customer's needs will be best able to tailor his products or services accurately to meet those needs.

Such information does not exist in a vacuum, however. The successful sales professional must simultaneously understand the capabilities and applicability of his products and services, in order to tailor those products and services to match the customer's needs precisely. Thus there exists a need for a tool which can quickly profile a customer's needs while simultaneously serving as a roadmap to enable the sales professional to tailor his offering in response.

Furthermore, in light of the current circumstances in today's information-rich business environment, customers' needs can change rapidly in response to newly-acquired information. The successful sales professional therefore needs a tool such as that described above, yet which is readily accessible, and capable of responding instantaneously to changes in customer needs.

Consistent with the above, there is also a need for a tool which managers can use to gauge the market in which their products and services compete, and to structure a marketing strategy and organization to exploit that market, while simultaneously providing the highest quality products and services to customers.

OBJECTS OF THE INVENTION

In order to meet the above-identified needs that are unsatisfied by the prior art, it is an object of the present invention to provide a method and apparatus for strategic profiling It is a further object of the present invention to provide a method and apparatus for strategic profiling that is readily accessible to multiple users at remote locations.

Another object of the present invention is to provide a strategic profiling method and apparatus that accurately reflects customers' value drivers.

These and other objects of the invention, as well as a fuller understanding of the advantages thereof, can be had by reference to the following description and claims.

SUMMARY OF THE INVENTION

The Strategic Profiling method and apparatus of the present invention provides a remotely accessible multiple user tool that is preferably internet-based. The Strategic Profiler of the present invention employs the five factor model to develop an accurate predictor of customer actions. By making direct and indirect inquiries of individual customers and/or groups of customer representatives, the Strategic Profiler of the present invention develops and provides a graphic representation of customer ideals and simultaneously represents customer views of reality. These profiles are developed from statistical analysis of raw data, and are accurate to a high degree of mathematical precision.

Traditional customer research has centered on determining an existing or potential customer's attitude. Attitudes are easily discovered by simply asking someone what he feels. However, attitudes are often a poor indicator of a customer's purchasing behavior. Understanding behavior requires a much more complex discovery mechanism because most people are unable to definitively predict or communicate how they will behave in a certain situation.

Since the 1930's, personologists have been trying to find the smallest number of synonym clusters, or factors, that account for individual differences in personality. Just in the last ten years, that effort has made giant strides because of the availability of modern, high-speed computers and factor-analysis programs. Considerable research and academic study has led to the development of multiple factor models for predicting human behavior such as consumer purchasing. One of the long held goals of psychology has been to establish a model that can conveniently describe human personality with the intent to use the model in the general understanding of personality and in the prediction of human behavior. Currently, a handful of models have risen to prominence, and some models are more generally accepted than others. One of the most prominent models in contemporary psychology is what is known as the five-factor model of personality.

The five-factor model incorporates five different variables into a conceptual model for describing personality. The five-factor theory is among the newest models developed for the description of personality, and it has been demonstrated to be among the most practical and applicable models available in the field of personality psychology.

The five factors are generally known by letter designations: S (for Sensitivity, often labeled N for Negative Emotionality or Neuroticism), O (for Openness, Culture, or Intellect), E (for Extraversion or Surgency), C (for Conscientiousness or Will to Achieve), and A (for Agreeableness).

Historically, multiple factor models have been developed and employed with varying levels of success. For example, Eysenck developed a theory that initially compared two dimensions of personality which he called the "Big Two". Later, Eysenck would add Psychoticism to his two initial factors of Extraversion/Introversion and Neuroticism. These three factors make up the "Big Three", which is similar to the five factor model. The major difference is that there are only four super-factors accounted for, as Eysenck's Psychoticism factor is a mixture of Agreeableness and Consciousness. This three factor model, referred to as the PEN model, remains popular today, The current five factor model can trace its evolution to Cattell's complex system of 16 primary factors and 8 secondary factors, a system that has been criticized by many. Even Cattell to some extent admitted that his 16 factors tend to support four major factors. These four factors have been associated with the Big Five.

In all cases, the methodology of assessing personalities is similar. Raw data are collected usually through the use of questionnaires or interviews, and the responses are categorized, weighted and scored to provide numerical indices for each factor included in the model. The recent development of improved statistical analysis techniques, combined with potent and readily available computing power, led to the discovery that there were mathematical errors in several of the historically popular multiple factor behavior models. Furthermore, several different multiple factor models were determined to share basic variables, so the spectrum of reliable personality models based on multiple factors was reduced to a small number of well regarded models. The five factor model employed in the present invention offers the benefits of a well respected personality and behavior predicting model, while avoiding the possibilities of oversimplification presented by the multiple factor models employing fewer factors, as well as avoiding the complexity and necessary vagueness inherent in multiple factor models employing a greater number of factors. Persons of ordinary skill in the relevant art will recognize, however, that the Strategic Profiler of the present invention may employ any multiple factor behavior and personality model, with resultant changes in the quality and reliability of the output.

DETAILED DESCRIPTION OF A PREFERRED EMBODIMENT

The present invention uses an outside reference point to draw out a customer's true desires and future behavior. This reference point is called the ideal. The ideal is the way a customer wishes a product or service offering would perform within a situation. Yet, simply asking customers about their ideal would require that the customer already understand the benefits of each feature or function the offering contains. That is not only unlikely, it is impossible. The optimum way for a customer to describe their ideal is by personifying the offering. Personification of the ideal is an indirect questioning technique that reaches far beyond feature/function attributes.

The method of personifying the ideal is designed to produce a beneficial effect of revealing a customer's value drivers. Using the five factor model, the Strategic Profiler of the present invention will identify the customer's five key value drivers, and the Strategic Profile also lists the importance of those drivers to the customer. The Profile also lists how the customer views the market of available products and services, which is referred to as today's reality, and how the customer wishes the ideal product or service would perform, which is referred to as the ideal target. Each of the five factors is further subdivided into a plurality of components. The Strategic Profile also ranks the relative importance of each of the components to the customer. In a preferred embodiment of the invention, the Strategic Profile is developed using approximately 70 questions. Of these 70 questions, approximately are devoted to the personification of the ideal, and approximately 15 questions are devoted to the personification of today's reality. Finally, approximately 40 questions are devoted toward experience components, which are questions specially tailored for a particular product or offering. The first two sets of questions, the personification of the ideal and the personification of today's reality, are standard questions, while the experience components are, as discussed above, specifically tailored for a particular product or service offering.

An important aspect of the invention is the use of the Internet to host the Strategic Profiling questionnaire. The questionnaire can be made available to all of a company's customers, allowing them to complete the questionnaire at their leisure. Using the Internet also allows the results of the questionnaires to be compiled and made available to all sales personnel over the Internet. Furthermore, internet availability enables the users, or customers, to participate in and benefit from the Strategic Profile without the need for installing software or hardware. In practice, a company such as Miller-Williams will host all the questionnaires and data on their website. The host company will then allow sales representatives of a client company to view all the responses for that particular company, but not responses for any other company. A marketing representative from a particular company will be allowed to view the results from one customer of the company, or combinations of several customers of the company. The Strategic Profile will allow the marketing representative to understand what is driving a purchaser's decision and to tailor his marketing approach to that customer's behavior. Because the information is available on the Internet, a marketing representative may access the information, for example, the night before a sales call is made at a customer's site. Alternatively, a marketing manager may view Strategic Profile information from one or several customers when making hiring decisions, so as to develop a marketing staff that will be best equipped to tailor a company's products and services to the full spectrum of customer needs tracked and analyzed by the Strategic Profiler.

Figure 3:
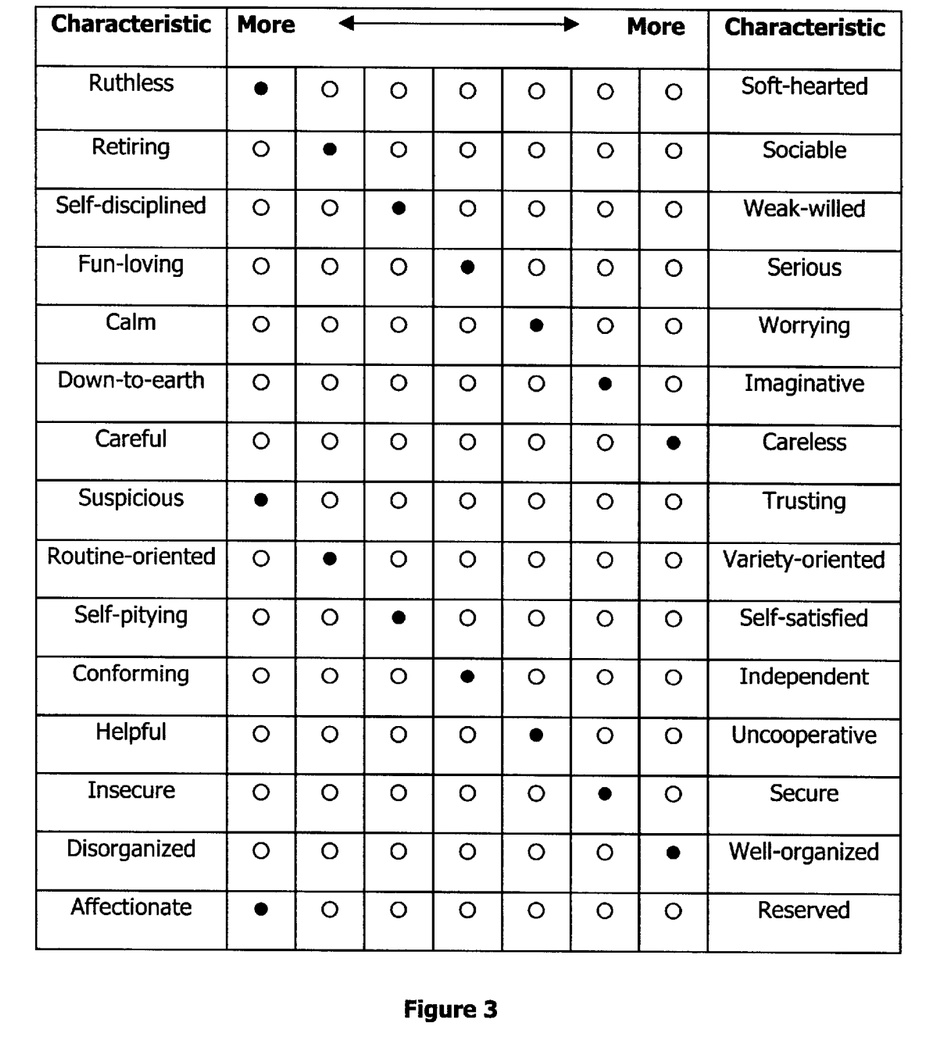
FIG. 3 is a table showing an exemplary set of questions that may be used to personify a respondent's ideal with answers to the questions.

In a preferred embodiment of the present invention, raw data is collected to develop the Strategic Profile. The first segment of data collection is for the personification of the ideal. In the preferred embodiment, the data for personification is collected through answers to 15 standard questions. Since these questions are standard, in the preferred embodiment the same questions may be used for different markets, products and services, as long as the relevant market, products and services are described in the preamble to the questions. For example, in a food service industry application of the Strategic Profiler, data which will be used to personify the customer's ideal is determined through answers to the questions as shown in FIG. 3 and presented below.

Imagine for a moment what your IDEAL Food Service Provider would be like. Now, we'd like you to pretend that YOU ARE THAT PROVIDER. As that IDEAL Food Service Provider, what qualities or characteristics would best describe you? In the following section, select the radio button closest to the characteristic that most accurately describes you.

Now, as that IDEAL Food Service Provider, you would be more . . . .

Since the questions are standard, the same questionnaire chart could be employed in any other industry, as long as the preamble identifies the relevant industry. The responses to the questions used in personifying the ideal are designated as emotional responses.

Figure 4:
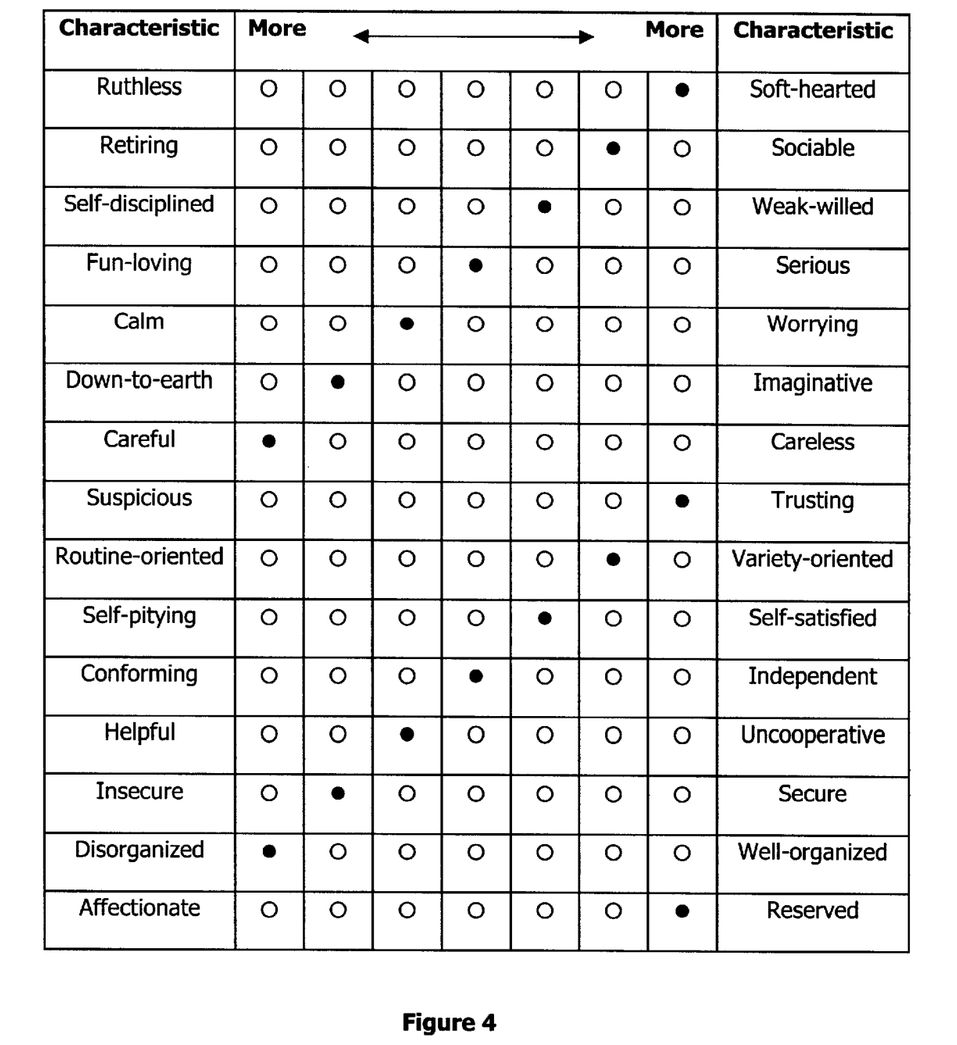
FIG. 4 is a table showing an exemplary set of questions that may be used to personify a respondent's view of reality with answers to the questions.

The Strategic Profiler of the present invention collects raw data for personifying the customer's view of "today's reality." Again, in the food service industry application of the Strategic Profiler, personification of "today's reality" data is collected from the user/customer through responses to the questions as shown in FIG. 4 and presented below:

Now, imagine for a moment what your Food Service Providers Today are like. Again, we'd like you to pretend that YOU ARE THOSE PROVIDERS and tell us which qualities or characteristics would best describe you.

As your Food Service Providers Today, you would be more . . . .

Again, since the questions are standard, the same questionnaire chart could be employed in any other industry, as long as the preamble identifies the relevant industry. The responses to the questions used in personifying today's reality are designated as rational responses.

Subsequently, the Strategic Profiler of the present invention collects data for development of an importance rating of experience components, through a questionnaire of typically 40 questions maximum. These 40 questions are flexible by design, to enable the Strategic Profiler to collect data that is the most relevant to the market, product or service that is being analyzed.

Figure 5A:
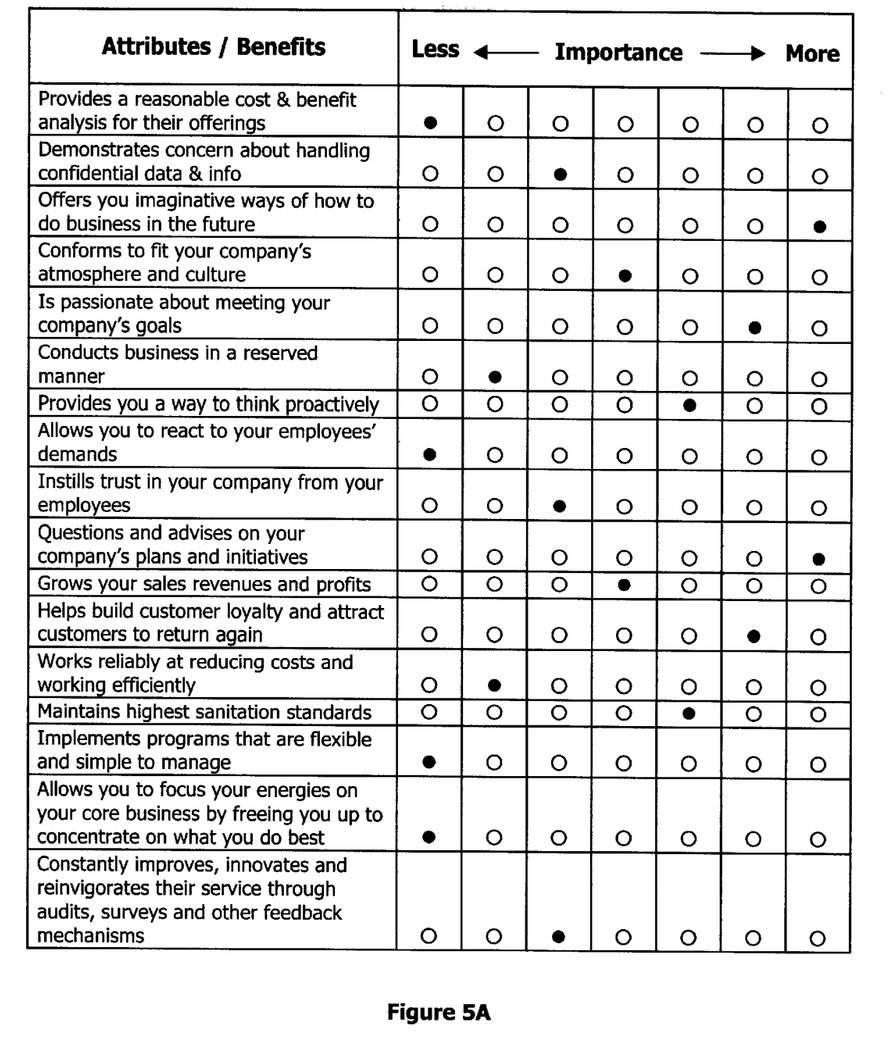
FIGS. 5A–5C are a table showing an exemplary set of questions that may be used to develop an importance ranking of a respondent's experience component with answers to the questions.
Figure 5B:
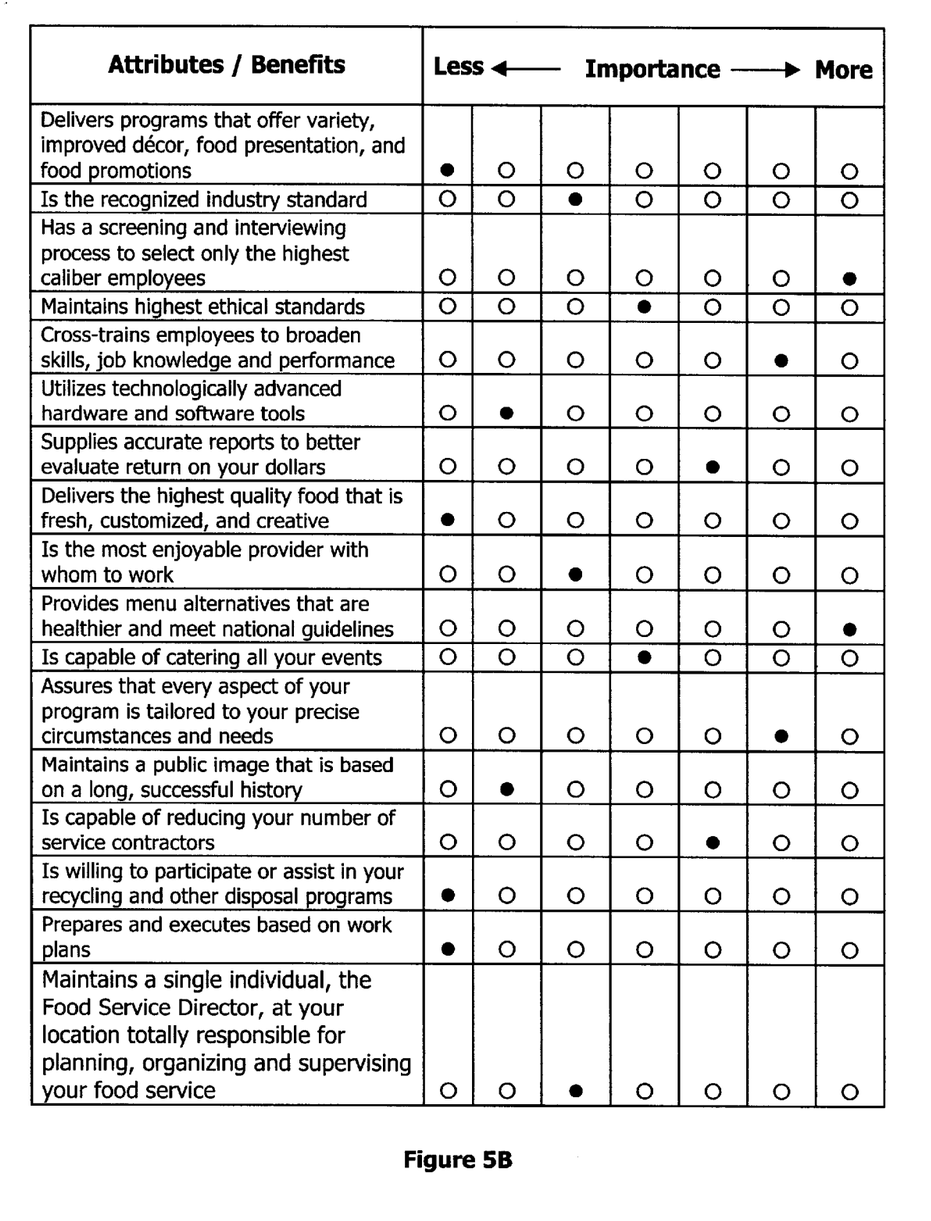
Figure 5C:
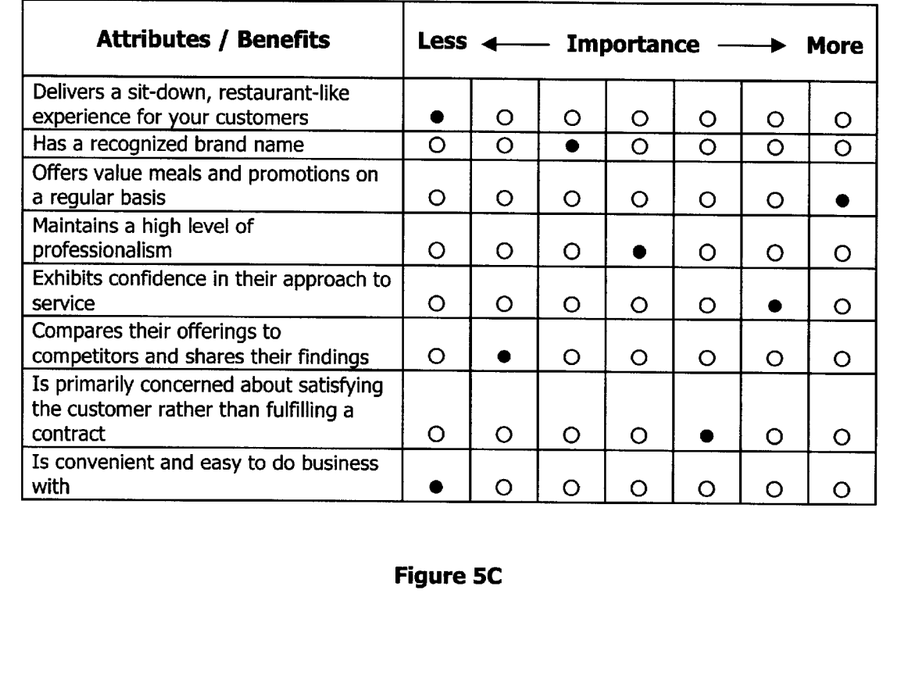

In the Food Service industry embodiment, the 40 questions are shown in FIGS. 5A–C and presented as follows:

Finally, we'd like you to rate how important a few attributes or benefits are to you regarding a Food Service Provider. For each statement, select the radio button that best describes its level of importance to you, where the button furthest right is extremely important and the button furthest left is not important at all.

How important is it to you that a Food Service Provider . . . .

Since the 40 questions used to collect raw data for developing the importance rating of experience clusters are flexible, the Strategic Profiler of the present invention permits adjustment of the questionnaire to fit the appropriate markets, products, and services being analyzed.

While in the preferred embodiment of the present invention the data are collected via networked computer-resident questionnaires, the data may be collected just as reliably through various other means. In-person or remote interviews, and even observation are permissible means of data collection for the Strategic Profiler.

For each separate question in all of the questionnaires, a value between one and seven is assigned, to reflect the emotional intensity of the response. The 15 standard questions in personalization of both the ideal and today's reality are categorized according to the five factors, typically with 3 questions being identified with each one of the five factors A, C, O, E, and S. By tabulating the data from the questionnaire for personifying the ideal (representing the answers with assigned emotional response factors to each response), the intensity of each factor is determined and each factor is ranked relative to each other. This intensity ranking will of course vary with different individual users, different groups of users, and with different markets, products, and services. In the preferred embodiment of the present invention, the results are normalized to present a median score of 100. The normalization of the data has no effect on the quality of the data, it is intended only to ease the delivery of the information. Accordingly, the data may be normalized to center around any arbitrary benchmark number that the user finds convenient.

In the preferred embodiment, the importance rank of the key value drivers is determined only by the responses to experience components, and that importance rank is used for analyzing and displaying the results of all collected data.

Simultaneously, in each value driver category, the responses to the today's reality questionnaire and the experience components are collected and averaged. Using a correlation matrix, the experience component data are grouped into the five key value drivers associated with the dimensional factors from the five factor model. The data are averaged for each question, and grouped using a regression analysis technique. Finally, the data are normalized to center around an arbitrary benchmark figure, which is 100 in the preferred embodiment.

After reviewing the clusters and their components, each of the five factor dimensions around which the responses are clustered are given meaningful industry-specific names. In the food service example of a preferred embodiment of the present invention, these five factors are named as the key value drivers Fundamentals (E), Customer-Focus (C), Cultural Fit (A), Business Approach (S), and Vision (O), listed in decreasing order of importance. Persons of ordinary skill in the relevant art will recognize that these key value drivers will either be pre-established by the users of the Strategic Profiler, or they will be readily ascertainable through minimal research in the relevant industry and/or interaction with the Strategic Profile users. However, prior art customer research systems do not provide a means for identifying the relative intensity of the key value drivers.

All statistical manipulation in the present invention is typically performed using statistical analysis software including statistical regression and cluster analysis software that permits the collection and manipulation of large amounts of data quickly. Examples of such software can range from specific statistical analysis applications, to statistical manipulation features that are included in many commercially available spreadsheets and word processors, or to original programs developed specifically for the purpose.

Figure 1:
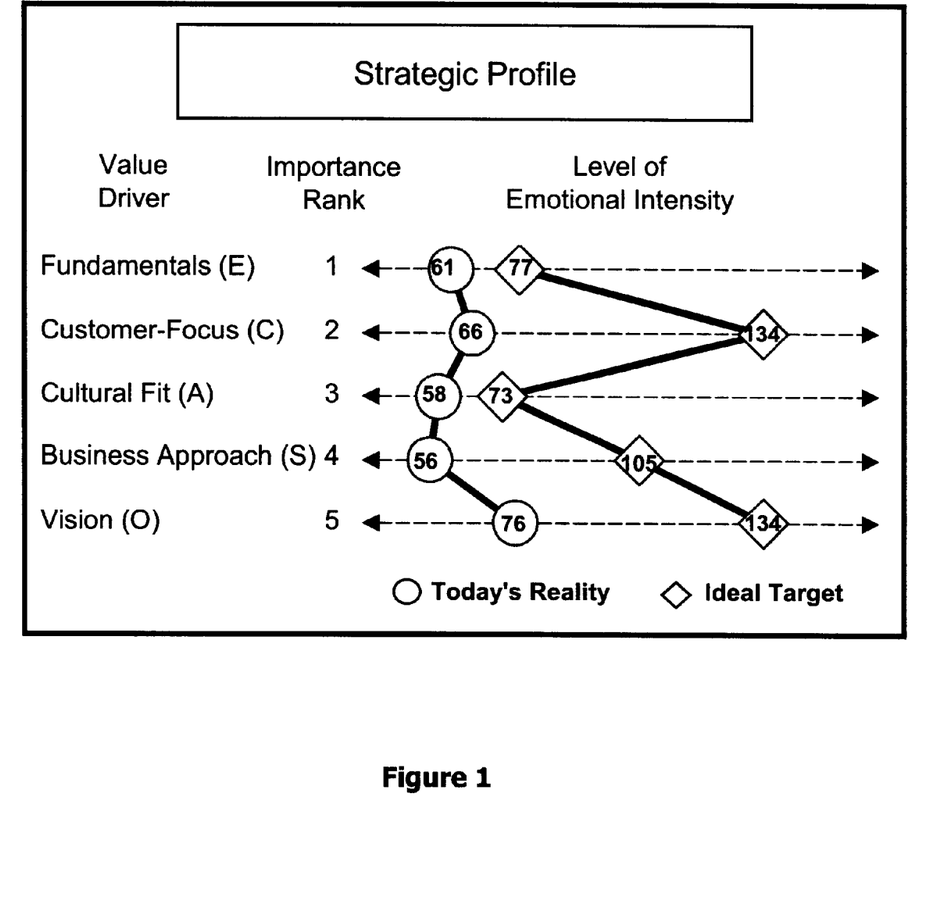
FIG. 1 is a graphical presentation of the collected and analyzed data associated with the Strategic Profile of an embodiment of the present invention.

Further, in the preferred embodiment of the present invention, the collected and analyzed data is displayed in a graphic form such as that shown below:

By displaying the results graphically, the Strategic Profiler of the present invention provides users with a simple format for withdrawing the relevant information quickly. Sales professionals will quickly recognize that increasing levels of supplier performance will cause the representation of today's reality to approach the ideal. In the graphic depicted above for the food service industry example of the preferred embodiment, the areas of highest supplier performance are Fundamentals and Customer Fit. Conversely, dimensions where today's reality diverges significantly from the ideal is indicative of supplies non-performance, and a corresponding opportunity for a marketing representative or a supplier to offer a product or service that will more closely meet the customer's needs.

Figure 2:
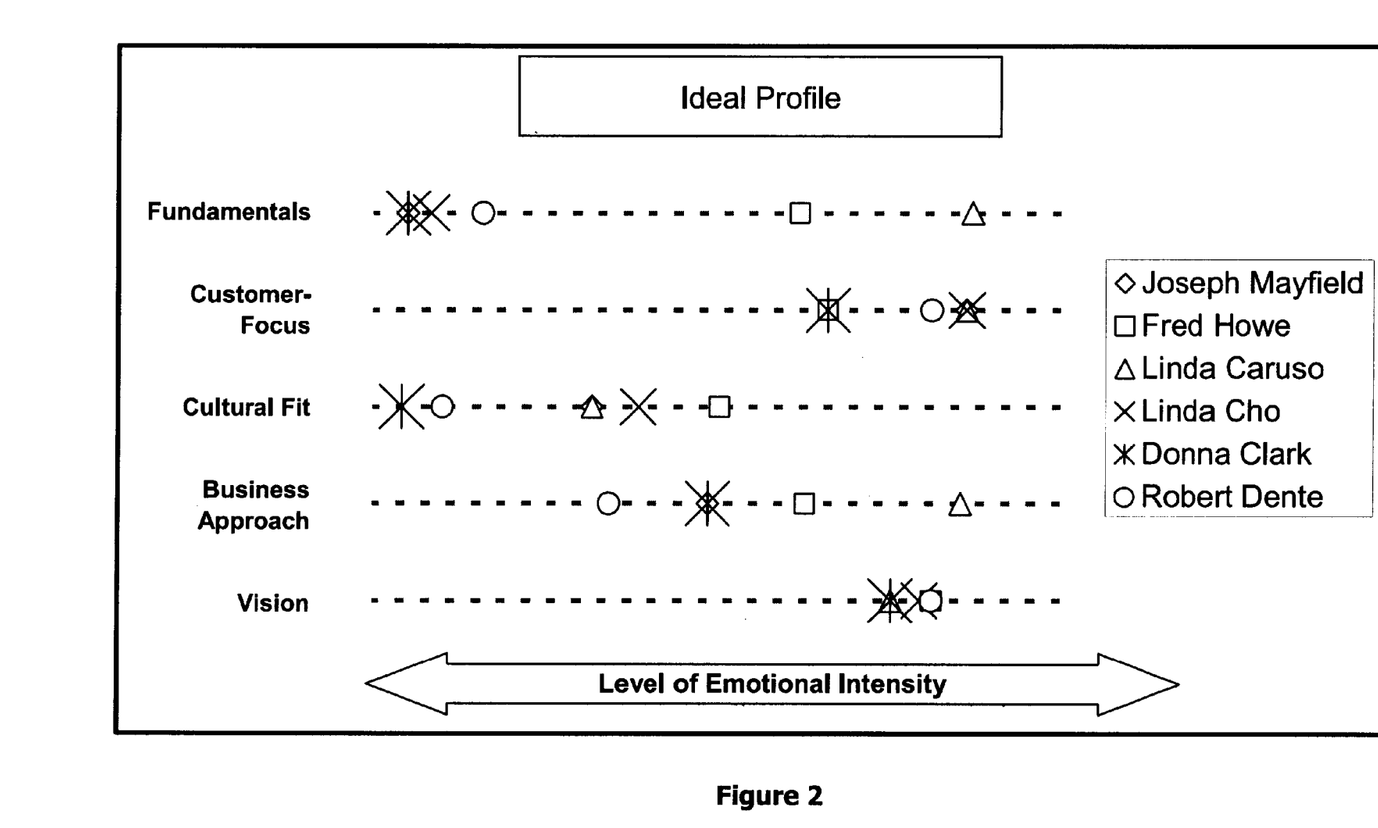
FIG. 2 is a graphical presentation of the collected and analyzed data of an embodiment of an ideal profile showing the relative ranking of the ideal for each respondent.

A second graphical format is shown in FIG. 2 and presented below, for displaying the results of data collection and analysis using the customer intelligence methodology herein described. In the graph shown in FIG. 2 and presented below, the relative ranking of the ideal is shown in FIG. 2 for each individual respondent to the surveys.

The graphic representation of each participant's ideal profile will be useful in various ways. For example, if the participants are sales representatives, managers may be interested in viewing the ideal profiles to search for common trends among successful sales representatives, and develop training and marketing materials to encourage all sales representatives to adopt similar ideal profiles.

Another aspect of the preferred embodiment of the Strategic Profiler is its installation and availability as a World Wide Web-based application. The Strategic Profiler of the present invention assesses rational and emotional intensity for key value drivers in the sales decisionmaking process. By deploying the Strategic Profiler as a Web-based application to collect survey results and provide a breakdown of Key Value Driver ratings, participants gain personal, immediate feedback. This interactive aspect of the data collection, analysis and display will permit the continuous assessment and improvement of the statistical analysis features of the present invention. Further with regard to the Web-based installation and operation of the Strategic Profiler, all data including survey questions, responses, and identification and demographic information regarding the participants will be stored in a relational database. Use of a relational database will permit the operators and users of the Strategic Profiler to retrieve any specific combination or portion of data desired.

Furthermore, installation and operation of the Strategic Profiler on the World Wide Web will eliminate the need for the users to make multiple installations for each user, and will further prevent the need for expensive hardware or software purchases and installation in order to use the Strategic Profiler of the present invention. For many potential sales organizations, Web-based applications represent the only means to acquire simultaneous realtime input from its entire marketing staff or customer base.

While the invention has been described and illustrated herein by references to various specific embodiments, it is understood that the invention is not restricted to those particular embodiments and descriptions selected for that purpose. It will, however, be evident to those skilled in the art that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method for strategic profiling behavior of a human consumer, comprising the steps of:

collecting from the human consumer via a computer a first set of quantitative data reflecting an ideal of the human consumer, the first set of quantitative data based on a pre-defined, fixed number of standard, bi-polar characteristics generic to different markets, products, and services and an input selected by the human consumer out of a fixed, limited number of possible inputs for each characteristic, the input representing the intensity for each characteristic to the human consumer;

collecting from the human consumer via a computer a second set of quantitative data reflecting reality of the human consumer, the second set of quantitative data based on the same pre-defined, fixed number of standard, bi-polar characteristics that the first set of quantitative data is based on and an input selected by the human consumer out of a fixed, limited number of possible inputs for each characteristic, the input representing the intensity for each characteristic to the human consumer;

collecting from the human consumer via a computer a third set of quantitative data reflecting experience of the human consumer, the third set of quantitative data based on a pre-defined, fixed number of experience components specific to at least one of a market, product, and service and an input selected by the human consumer out of a fixed, limited number of possible inputs for each experience component, the input representing the importance for each experience component to the human consumer;

categorizing via a computer each of said collected data into a predetermined, constant, fixed number of factors accounting for individual differences in human consumer personality according to a multiple factor personality model for human behavior prediction;

analyzing via a computer said categorized data to determine an importance ranking of the factors in said multiple factor personality model based on the third set of quantitative data reflecting experience of the human consumer and the importance of each experience component to the human consumer; and arranging via a computer said categorized data to represent the importance ranking of the factors in said multiple factor personality model and a profile of ideal and reality results for each of said ranked factors to strategically profile human consumer behavior.

2. The method of strategic profiling of claim 1, wherein said multiple factor personality model is a five factor model, and categorizing includes categorizing each of said collected data into five factors that account for individual differences in human consumer personality.

3. The method of strategic profiling of claim 2, wherein the five factor model is the "Big Five" personality model.

4. The method of strategic profiling of claim 1, wherein said data is collected via responses to questionnaires.

5. The method of strategic profiling of claim 1, wherein said data is collected via an internet installed application.

6. The method of strategic profiling of claim 5, wherein said internet installed application is a World Wide Web page.

7. The method of strategic profiling of claim 1, further comprising the step of displaying the importance ranking of the factors and the profile of ideal and reality results for each of said ranked factors in a two-dimensional graphical form and only a two-dimensional graphical form.

8. The method of strategic profiling of claim 1, wherein said data is collected simultaneously from at least two individuals in at least two different respective locations.

9. The method of strategic profiling of claim 1, further comprising the step of analyzing said categorized data to determine the relative intensity of the factors in said multiple factor personality model.

10. A computer-implemented strategic profiler for strategic profiling behavior of a human consumer, comprising:

means for collecting from the human consumer and storing a first set of quantitative data reflecting an ideal of the human consumer, the first set of quantitative data based on a pre-defined, fixed number of standard, bi-polar characteristics generic to different markets, products, and services and an input selected by the human consumer out of a fixed, limited number of possible inputs for each characteristic, the input representing the importance for each experience component to the human consumer;

means for collecting from the human consumer and storing a second set of quantitative data reflecting reality of the human consumer, the second set of quantitative data based on the same pre-defined, fixed number of standard, bi-polar characteristics that the first set of quantitative data is based on and an input selected by the human consumer out of a fixed, limited number of possible inputs for each characteristic, the input representing the importance for each experience component to the human consumer;

means for collecting from the human consumer and storing a third set of quantitative data reflecting experience of the human consumer, the third set of quantitative data based on a pre-defined, fixed number of experience components specific to at least one of a market, product, and service and an input selected by the human consumer out of a fixed, limited number of possible inputs for each experience component, the input representing the importance for each experience component to the human consumer;

means for categorizing each of said stored data into a predetermined, constant, fixed number of factors accounting for individual differences in human consumer personality according to a multiple factor personality model for human behavior prediction;

means for analyzing said categorized data to determine an importance ranking of the factors in said multiple factor personality model based on the third set of quantitative data reflecting experience of the human consumer and the importance of each experience component to the human consumer; and means for arranging said categorized data to represent the importance ranking of the factors in said multiple factor personality model and a profile of ideal and reality results for each of said ranked factors to strategically profile human consumer behavior.

11. The strategic profiler of claim 10, further comprising means for analyzing said categorized data to determine the relative intensity of the factors in said multiple factor personality model.

12. The strategic profiler of claim 10, wherein said multiple factor personality model is a five factor model.

13. The strategic profiler of claim 12, wherein the five factor model is the "Big Five" personality model.

14. The strategic profiler of claim 10, wherein said means for collecting and storing data includes questionnaires.

15. The strategic profiler of claim 10, wherein said means for collecting and storing data includes an internet installed application.

16. The strategic profiler of claim 15, wherein said internet installed application is a World Wide Web page.

17. The strategic profiler of claim 10, further comprising means for displaying the importance ranking of the factor and the profile of ideal and reality results for each of said ranked factors in a two-dimensional graphical form and only a two-dimensional graphical form.

18. The strategic profiler of claim 10, wherein said means for collecting and storing data includes means for collecting data simultaneously from at least two individuals in at least two different respective locations.

* * * * *